US009262835B2

(12) United States Patent
Oh et al.

(10) Patent No.: US 9,262,835 B2
(45) Date of Patent: Feb. 16, 2016

(54) METHOD, APPARATUS, AND MEDICAL IMAGING SYSTEM FOR SEGMENTING IMAGE OF OBJECT FROM IMAGE OF ORGAN

(71) Applicant: Samsung Electronics Co., Ltd., Suwon-si (KR)

(72) Inventors: Young-taek Oh, Seoul (KR); Do-kyoon Kim, Seongnam-si (KR); Jung-bae Kim, Hwaseong-si (KR); Won-chul Bang, Seongnam-si (KR); Young-kyoo Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 13/949,898

(22) Filed: Jul. 24, 2013

(65) Prior Publication Data

US 2014/0119625 A1 May 1, 2014

(30) Foreign Application Priority Data

Nov. 1, 2012 (KR) ........................ 10-2012-0123092

(51) Int. Cl.
*G06K 9/00* (2006.01)
*G06T 7/00* (2006.01)
*G06T 7/60* (2006.01)

(52) U.S. Cl.
CPC ............ *G06T 7/0081* (2013.01); *G06T 7/0093* (2013.01); *G06T 7/0097* (2013.01); *G06T 7/60* (2013.01); *G06T 2207/10081* (2013.01); *G06T 2207/10088* (2013.01); *G06T 2207/30056* (2013.01)

(58) Field of Classification Search
None
See application file for complete search history.

(56) References Cited

U.S. PATENT DOCUMENTS

| 6,718,054 | B1 | 4/2004 | Lorigo et al. |
| 2006/0210158 | A1 | 9/2006 | Pekar et al. |
| 2007/0253610 | A1 | 11/2007 | Pieper et al. |
| 2008/0044072 | A1 | 2/2008 | Kiraly et al. |
| 2008/0097200 | A1* | 4/2008 | Blume et al. ............... 600/431 |
| 2008/0247622 | A1 | 10/2008 | Aylward et al. |
| 2009/0046910 | A1* | 2/2009 | Lee et al. ................... 382/130 |
| 2010/0295848 | A1 | 11/2010 | Grewer et al. |
| 2011/0293150 | A1 | 12/2011 | Capolunghi et al. |

FOREIGN PATENT DOCUMENTS

| KR | 10-0752333 | 7/2006 |
| KR | 10-2008-0078989 | 8/2008 |
| KR | 10-1017611 | 12/2009 |
| KR | 10-1028365 | 8/2010 |
| KR | 10-1169138 | 7/2011 |

* cited by examiner

*Primary Examiner* — Atiba O Fitzpatrick
(74) *Attorney, Agent, or Firm* — NSIP Law (57) ABSTRACT

A method, an apparatus, a computer readable recording medium, and a medical imaging system are provided for segmenting an image of an object from an image of an organ. The method includes: generating a reference model of the object by using a priori knowledge related to the object of the organ; determining whether the first image includes a first area in which a shape of the object is unidentified; and in response to determining that the first image excludes the first area, segmenting a second image of the object from the first image, and in response to determining that the first image includes the first area, estimating a progression direction of the first area from the reference model to segment the second image from the first image.

19 Claims, 6 Drawing Sheets

METHOD, APPARATUS, AND MEDICAL IMAGING SYSTEM FOR SEGMENTING IMAGE OF OBJECT FROM IMAGE OF ORGAN

CROSS-REFERENCE TO RELATED APPLICATIONS

This application claims the benefit under 35 U.S.C. §119(a) of Korean Patent Application No. 10-2012-0123092, filed on Nov. 1, 2012, in the Korean Intellectual Property Office, the disclosure of which is incorporated herein in its entirety by reference.

BACKGROUND

1. Field

The following description relates to a method, a computer-readable storage medium, an apparatus, and a medical imaging system for segmenting an image of an object from an image of an organ.

2. Description of the Related Art

For patient-specific organ modeling, necessary information may be obtained from a medical image of the patient such as a computed tomography (CT) image or a magnetic resonance imaging (MRI) image. This process, which isolates an object from pictures of an organ, is referred to as a segmentation. For this image segmentation, methods of segmenting an image of a desired object from an image of an organ based on a known shape of the organ or directly segmenting an object from an image of an organ of a patient by a user have been used. Additionally, methods of using well-known shapes of organs have been used.

It is difficult to segment a complicated organ that has a tree structure such as a liver or a blood vessel of a kidney. This task is difficult because of the complexity of shapes of organs, and also because information about organs disappears or overlaps with one another due to problems related to resolution, timing requirements, and/or other characteristics of medical imaging apparatuses. Nevertheless, various segmentation methods have been proposed to provide operational solutions to these problems due to the importance of imaging organs such as blood vessels.

However, in currently existing approaches, factors such as the disappearance of information about items such as blood vessels or the like or issues related to overlapping parts is not considered, and hence such information is not automatically used to help address the problems discussed above.

SUMMARY

In a general aspect, there is provided a method for segmenting an image of an object from an image of an organ with precision. In another general aspect, a computer-readable storage medium is provided for segmenting an image of an object from an image of an organ with precision, the computer-readable storage comprising instructions to cause a computer to execute the method. In yet another general aspect an apparatus is provided for segmenting an image of an object from an image of an organ with precision. In yet another general aspect, a medical imaging system is provided for segmenting an image of an object from an image of an organ with precision.

According to an aspect of the present invention, a method of segmenting an image of an object from an image of an organ of an examinee may include: generating a reference model of the object by using a priori knowledge related to the object of the organ; determining whether a first image of the organ comprises a first area in which a shape of the object is unidentified; in response to determining that the first image excludes the first area, segmenting a second image of the object from the first image; and in response to determining that the first image comprises the first area, estimating a progression direction of the first area from the reference model to segment a second image of the object from the first image.

According to another aspect of the present invention, a computer readable recording medium may record thereon a program to execute the method in a computer.

According to another aspect of the present invention, an apparatus to segment an image of an object from an image of an organ may include: a reference model generator configured to generate a reference model of the object by using a priori knowledge related to the object of the organ; a determiner configured to determine whether a first image of the organ comprises a first area in which a shape of the object is unidentified; and an image segmenting part configured to segment a second image of the object from the first image in response to determining that the first image excludes the first area and to estimate a progression direction of the first area from the reference model to segment the second image from the first image in response to determining that the first image comprises the first area.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
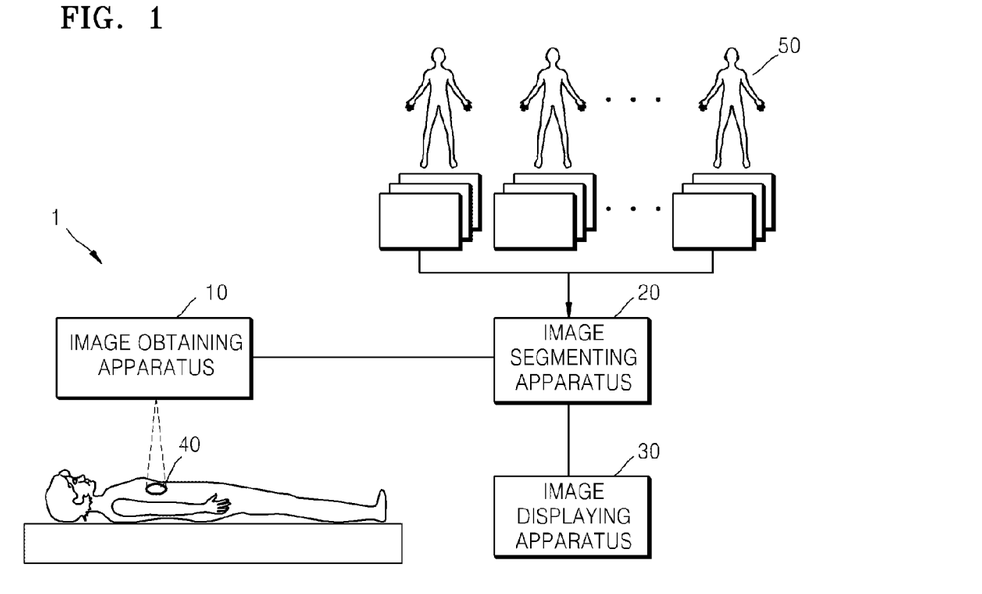
FIG. 1 is a diagram illustrating a system configured to segment an image of object from an image of an organ, according to an embodiment.

FIG. 1 is a diagram illustrating a system 1 configured to segment an image of object from an image of an organ, according to an embodiment. The system 1 includes an image obtaining apparatus 10, an image segmenting apparatus 20, and an image displaying apparatus 30.

The image obtaining apparatus 10 obtains an image, hereinafter referred to as a medical image of an examinee, of an organ 40 of an examinee that includes an object. The object may include a tube-shaped tissue among tissues forming the organ 40, and the tube-shaped tissue may include combinations of main streams and one or more branches. For example, if the organ 40 is a liver of an examinee, the tube-shaped tissue included in the object may be blood vessels distributed in the liver. However, embodiments are not limited to this example, and as other examples, any tissue having a tubular shape including a lymphatic gland, a bile duct, or the like may correspond to the object.

For example, the medical image of the examinee may include an image from which anatomical information is easily derived. Such anatomical information of the organ 40 may include a shape, a contour, or an internal characteristic of the organ 40, e.g., a distribution characteristic of the blood vessels, or the like. The medical image of the examinee may be a computed tomography (CT) or magnetic resonance imaging (MRI) image but is not limited thereto. For example, other scans such as x-rays or ultrasound scans may be used in certain embodiments as an alternative or supplemental sources of a medical image of the examinee. Thus, image obtaining apparatus 10 may be a medical imaging scanner, such as a CT scanner or an MRI scanner that is able to produce a medical image of the organ 40. Such scanners may be disposed, for example, above, below, to one side of, or around the examinee when obtaining the image. Additionally, such scanners may use radiation of various sorts, in combination with a variety of radiation detectors and receivers, in order to produce images based on emitting radiation, having the radiation be incident upon the examinee, and generating images based on the characteristics of the radiation received be the radiation receivers after having passed through the examinee's body. Image obtaining apparatus 10 may also include protective elements, such as a lead sheet, in order to protect parts of examinee's body from being subjected to radiation in a way that could overexpose the examinee to unnecessary radiation.

As discussed, different technologies produce medical images with different characteristics. However, the image obtaining apparatus 10 may produce images of the organ 40 that can be processed by other portions of embodiments to segment in order to segment an object included in the organ 40. The image obtaining apparatus 10 transmits the medical image of the examinee to the image segmenting apparatus 20.

The image segmenting apparatus 20 receives the medical image of the examinee from the image obtaining apparatus 10. The medical image may be a digital image in a standard graphics format, such as JPEG, GIF, TIFF, PNG, and the like. After receiving the medical image, the image segmenting apparatus 20 segments the image of the object to isolate it from the picture of the organ 40. By segmenting the medical image, the image segmenting apparatus produces an image of the tube-shaped tissue from the medical image. For example, the image segmenting apparatus 20 may receive images, hereinafter referred to as external medical images 50, of organs 40 of a plurality of persons to generate a reference model which is a standardized model of an object. The external medical images 50 are intended to provide a compilation of medical images 50 that can be used to generate a reference model of organs 40 to help isolate objects within or attached to those organs.

Thus, the external medical images 50 provide views of organs 40, such that they act as examples that can be used as a standard with which to compare the medical image of the examinee. For example, by comparing the medical image of the examinee to medical images of analogous portions of organs 40 within a patient population, it becomes possible for some embodiments to be able to hypothesize about the location of such portions of organs 40 in the medical image of the examinee. Such hypothesizing is performed based on the reference model.

Accordingly, the image segmenting apparatus 20 may segment the image of the object from the medical image of the examinee from the image obtaining apparatus 10. The image segmenting apparatus 20 may update the reference model with reference to the segmented image of the object. Then, the image segmenting apparatus 20 transmits the segmented image of the object to the image displaying apparatus 30. The detailed operation of the image segmenting apparatus 20 will be described later with reference to the attached drawings.

The image displaying apparatus 30 receives the image of the object from the image segmenting apparatus 20 and displays the image of the object on a screen. For example, the screen may be a local monitor that displays the image of the object for viewing by a user. It will be recognized that the image displaying apparatus 30 may be based on the use of a wide variety of display technologies. The role of the image displaying apparatus 30 is to provide visual access to the results of segmenting the medical image.

Figure 2:
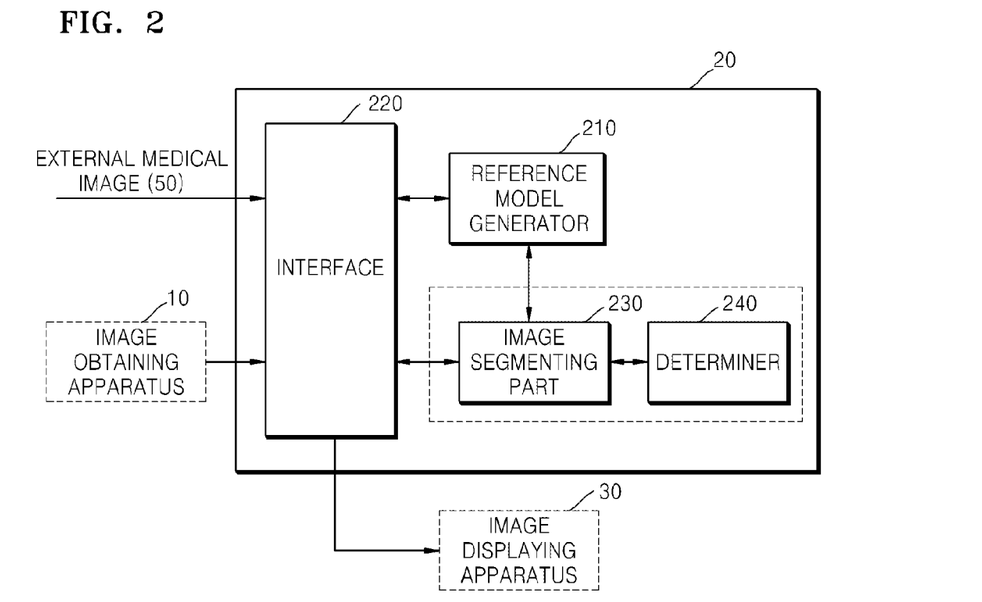
FIG. 2 is a diagram illustrating an image segmenting apparatus, according to an embodiment.

FIG. 2 is a diagram illustrating an image segmenting apparatus 20, according to an embodiment. The image segmenting apparatus 20 includes a reference model generator 210, an interface 220, an image segmenting part 230, and a determiner 240.

Only elements related to the present embodiment are illustrated in the image segmenting apparatus 20 of FIG. 2. Therefore, it will be understood by ordinary ones in the art that other general-purpose elements may be further included besides the elements of FIG. 2. The image segmenting apparatus 20 of FIG. 2 may correspond to one processor or a plurality of processors. As shown in FIG. 2, the image segmenting part 230 and the determiner 240 may be separate processors, but may alternatively operate using one processor. Furthermore, the image segmenting part 230 may be an image segmenting processor, an image segmentor or controller.

The reference model generator 210 generates a reference model of the object to be segmented from the medical image by using a priori knowledge of the object included in the organ 40. Such a priori knowledge is knowledge about the object to be found that is known, in advance, without the need for additional experimentation or accumulation of evidence.

In embodiments, the a priori knowledge of the object that is used may include anatomical information related to the object, statistical information related to the object, or a combination thereof. However, these are only examples of a priori knowledge, and other appropriate a priori knowledge may be used in order to generate a reference model of the object. For example, the reference model generator 210 may generate the reference model by using the statistical information of the object and the external medical images 50 received via the interface 220. Here, the external medical images 50 include images indicating the organ 40 including its relationship with the object contained within or attached to it for a plurality of human bodies obtained through previous medical practice. Here, the plurality of human bodies may include only bodies of a plurality of persons other than the examinee or may include bodies of a plurality of persons including the examinee. The external medical images 50 may include images from which the anatomical information of the organ 40 being considered is easily analyzed. For example, as discussed above, the external medical images 50 may be CT or MRI images but are not limited thereto.

The reference model generator 210 transmits data about the generated reference model, once it has been generated, to the image segmenting part 230. The reference model generator 210 may also update the reference model with reference to the image segmentation produced by the image segmenting part 230. More details about the operation of the reference model generator 210 will be described later with reference to FIGS. 3-5B.

The interface 220 obtains the image of the organ 40 of the examinee. For example, the interface 220 may receive the image of the organ 40 of the examinee from the image obtaining apparatus 10 and transmit the image of the organ 40 to the image segmenting part 230. Here, the interface 220 may be a unit to receive an input of data, a unit to send an output of data, or a unit to otherwise transmit information to a user through other units.

The interface 220 transmits the external medical image 50 received from an appropriate external source to the reference model generator 210. The interface 220 may also optionally receive an image of the reference model from the reference model generator 210, transmit the image of the reference model to the image displaying apparatus 30, and display the image of the reference model. The interface 220 may also receive the image of the object segmented from the image of the organ 40 of the examinee from the image segmenting part 230, transmit the image of the object segmented from the image of the organ 40 to the image displaying apparatus 30, and display the image of the object segmented from the image of the organ 40.

The interface 220 may transmit additional information input by the user, when the image segmenting part 20 segments the image, to the reference model generator 210 or the image segmenting part 230. This additional information may subsequently be used by the reference model generator 210 or the image segmenting part 230 to facilitate the performance of their functionality.

The determiner 240 determines whether the medical image of the organ 40 of the examinee includes a first area corresponding to an area in which a shape of the object is not identified. For example, the determiner 240 may determine whether the image of the organ 40 includes the first area when the image segmenting part 230 segments the image of the object from the image of the organ 40 of the examinee.

In response to determining that the image of the organ 40 does not include the first area, the image segmenting part 230 segments the image of the object from the image of the organ 40 of the examinee. In this scenario, no area in which the shape of the object is not identified is present, so it is possible to segment the object. In response to determining that the image of the organ 40 includes the first area, the image segmenting part 230 estimates a progression direction of the area in which the shape of the object is not estimated, from the reference model to segment the image of the object from the image of the organ 40 of the examinee. In this scenario, it becomes relevant to use special techniques to determine how to segment the object, even though there are issues which make it more difficult to segment the object.

For example, if the image segmenting part 230 receives information that the image of the organ 40 includes the first area, from the determiner 240 when segmenting the image of the object from the image of the organ 40 of the examinee, the image segmenting part 230 may estimate the progression direction of the first area from the reference model to segment the image of the object. As discussed above, in this case ordinary image segmentation techniques are insufficient due to the presence of the first area which complicates the segmentation task because there is an area in which a shape of the object is not identified. If the image segmenting part 230 receives information about that the image of the organ 40 does not include the first area, from the determiner 240 when segmenting the image of the object from the image of the organ 40 of the examinee, the image segmenting part 230 segments the image of the object from the image of the organ 40 of the examinee. Here, due to the absence of the first area, the image segmenting is not as complicated because there is not a first area in which special techniques for segmenting are required. A detailed operation of the image segmenting part 230 will be described later with reference to FIGS. 6-9.

As described above, the image segmenting part 230 refers to the reference model to segment the image of the object from the image of the organ 40 of the examinee. Therefore, the image segmenting part 230 may provide a way to more precisely segment the image of the object from the image of the organ 40 of the examinee.

Figure 3:
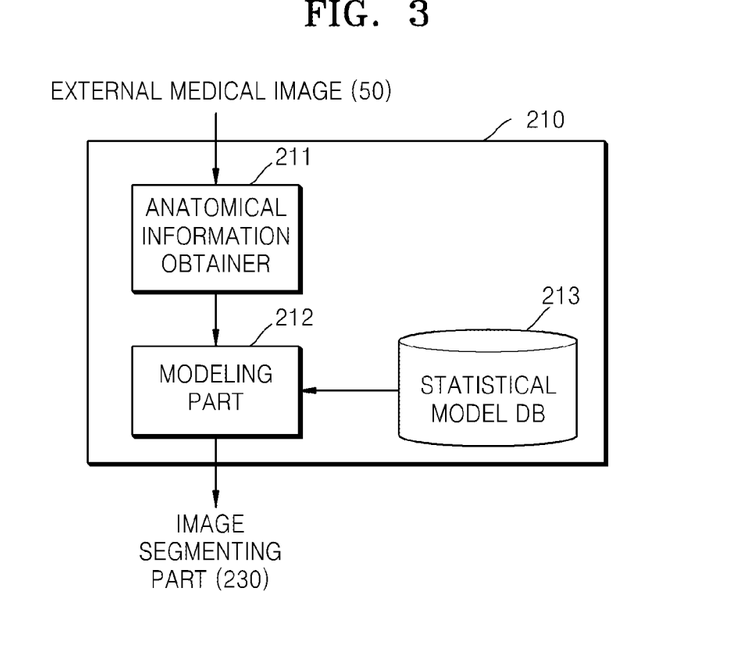
FIG. 3 is a diagram illustrating a reference model generator, according to an embodiment.

FIG. 3 is a diagram illustrating the reference model generator 210, according to an embodiment. The reference model generator 210 includes an anatomical information obtainer 211, a modeling part 212, and a statistical model database (DB) 213. Only elements related to the present embodiment are illustrated in the reference model generator 210 of FIG. 3. Therefore, it will be understood by ordinary ones in the art that other general-purpose elements may be further included besides of the elements of FIG. 3. Additionally, in addition to being supplemented by other elements, it is possible to use other elements to substitute for one or more of the elements provided in FIG. 3. The reference model generator 210 of FIG. 3 may implement its functionality using one processor or a plurality of processors.

The anatomical information obtainer 211 obtains anatomical information related to the object to be segmented from each of the external medical images 50 received from the interface 220. In detail, since perspectives of the whole shape of the organ 40, including the object to be segmented, appear in the external medical images 50, the anatomical information obtainer 211 extracts the anatomical information of the object from the external medical images 50. When the anatomical information obtainer 211 obtains the anatomical information, an opinion of a user, e.g., an opinion of a medical expert, information related to an object disclosed in documents, information obtained from a medical image of another person, etc., may be input and used from an external source and received via the interface 220.

The anatomical information obtainer 211 combines the anatomical information, obtained as has just been discussed from the external medical images 50, to calculate average anatomical information for the object. Particularly, if the object has its own characteristics, individuals may have different individual anatomical information. However, differences between the different pieces of individual anatomical information are not anticipated to be great as similar objects from similar organs are being accumulated. Therefore, an average of the anatomical information obtained from the external medical images 50 may be calculated and used to generate the reference model. The anatomical information obtainer 211 transmits the calculated anatomical information to the modeling part 212 for use in generating the reference model.

The statistical model DB 213 may store data indicating statistical information related to the object and transmit the stored data to the modeling part 212. Here, the statistical information may include information about lengths and radiuses of main streams and of one or more branches constituting the object obtained from previous medical practices, positions and the number of diverging points of other branches diverging from the main streams or the branches, etc. The statistical information, thus, generally includes descriptive information about the geometry and configuration that would be expected of the object, based on analysis of similar objects from similar past scenarios.

Figure 4:
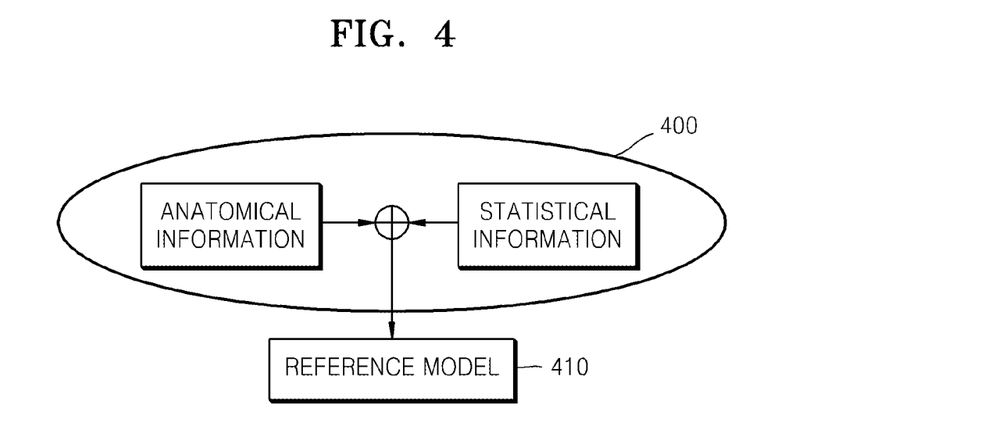
FIG. 4 is a diagram illustrating a method of generating a reference model, according to an embodiment.

FIG. 4 is a diagram illustrating a method of generating a reference model, according to an embodiment.

Referring to FIGS. 3-4, the modeling part 212 generates a reference model 410 by using a priori knowledge 400 of an object. Here, the a priori knowledge 400 of the object may include anatomical information received from the anatomical information obtainer 211 and statistical information received from the statistical model DB 213 or a combination thereof. However, other embodiments may use only anatomical information or statistical information, but not both. Also, embodiments may supplement the anatomical information or statistical information with additional a priori information about the object.

Figure 5A:
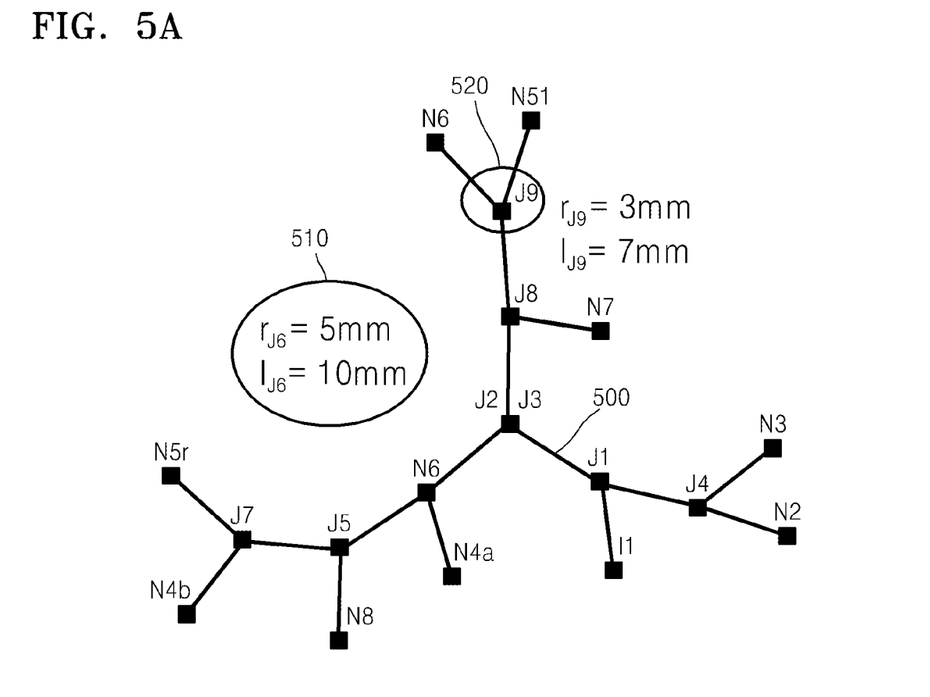
FIGS. 5A and 5B are diagrams illustrating a reference model, according to an embodiment.
Figure 5B:
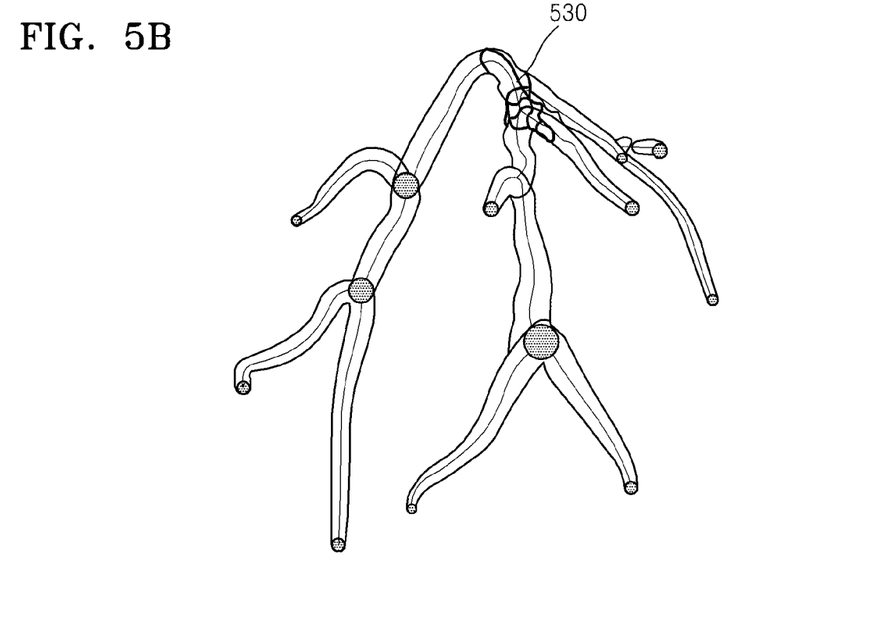

FIGS. 5A and 5B are views illustrating a reference model, according to an embodiment.

Referring to FIG. 5A, the modeling part 212 generates a reference model to display statistical information 510 of an object in a whole shape 500 of the object obtained from the anatomical information of the object. More specifically, in FIG. 5A, a tree shape formed of combinations of lines refers to the whole shape 500 of the object. Square-shaped points 520 refer to bifurcation points of main streams or branches. The statistical information 510 displayed adjacent to the whole shape 500 of the object refers to lengths and radiuses of the main streams or the branches. The statistical information 510 provides information about the configuration of the object that can be used to develop a geometric model of the object.

Referring to FIGS. 5A and 5B, the modeling part 212 may combine the whole shape 500 of the object obtained from the anatomical information of the object with the statistical information 510 of the object to generate a reference model 530 having a volume on which a length or a thickness of the object is reflected. As shown in FIG. 5B, such a reference model 530 may model both the shape of branches of the object and how wide the branches are.

Referring to FIG. 3 again, the modeling part 212 transmits the generated reference model 530 to the image segmenting part 230. By using the reference model 530, image segmenting part 230 can compare the reference model 530 to the medical image from the examinee, and use the reference model 530 to help identify the desired object when segmenting the medical image.

Figure 6:
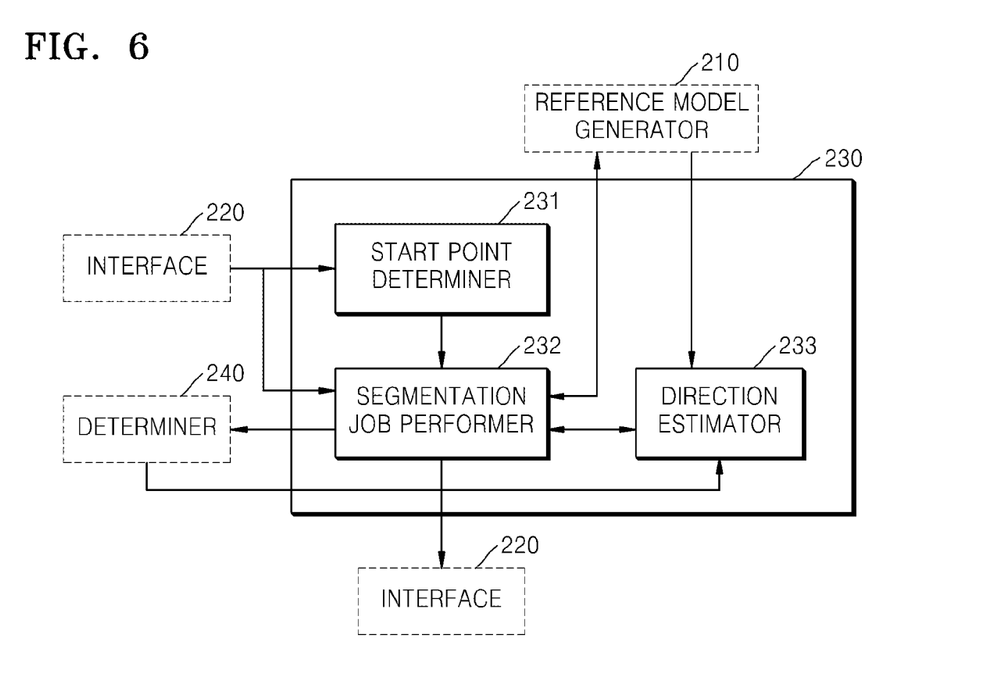
FIG. 6 is a diagram illustrating an image segmenting part, according to an embodiment.

FIG. 6 is a diagram illustrating the image segmenting part 230, according to an embodiment. The image segmenting part 230 includes a start point determiner 231, a segmentation job performer 232, and a direction estimator 233. Only elements related to the present embodiment are illustrated in the image segmenting part 230 of FIG. 6. Additionally, in addition to being supplemented by other elements, it is possible to use other elements to substitute for one or more of the elements provided in FIG. 3. Also, the image segmenting part 230 of FIG. 6 may implement its functionality using one processor or a plurality of processors.

The start point determiner 231 receives the medical image of the examinee from the interface 220 and determines a start point from the medical image of the examinee. Here, the start point refers to a point at which the image of the object starts separating from the other parts of the medical image of the examinee. The start point is an arbitrary point of a part of the medical image of the examinee indicating the object. The start point may be selected as a point at which the object is the most readily visually identified in the medical image of the examinee.

For example, if the medical image of the examinee is a CT image obtained by capturing an image of the liver of a patient, a vena cava inferior that is readily visually determined from the image of the liver may be established as the start point. The start point may be directly determined from the medical image of the examinee by a user, e.g., a medical expert, or may be automatically determined by the start point determiner 231 without an intervention of the user. The start point determiner 231 transmits data about a position of the determined start point to the segmentation job performer 232.

The segmentation job performer 232 segments the image of the object from the medical image of the examinee received from the interface 220 by using the data about the position of the start point received from the start point determiner 231 and the reference model received from the reference model generator 210. More specifically, the segmentation job performer 232 may segment the image of the object from the medical image of the examinee by using information derived from the reference model based in combination with the position of the start point of the medical image of the examinee.

For example, suppose that the medical image of the examinee is an image of the liver of the examinee, the object is blood vessels distributed in the liver, and the reference model does not include a hepatic portal vein. In this situation, an image of blood vessels contained in the liver, will not segment out a hepatic portal vein because the hepatic portal vein is not included in the reference model. Here, the information of the reference model may refer to a length and a diameter of a main stream, lengths and diameters of branches, or the like but is not limited thereto. For example, with respect to the previous example of blood vessels in a liver, the reference model may characterize the geometry and structure of those blood vessels.

The reference model generator 210 updates the reference model based upon the image of the object segmented from the medical image of the examinee by the segmentation job performer 232. Because the segmentation job performer 232 uses existing data to segment the object in the medical image of examinee, it is able to provide information from the present segmentation process for use in future segmentation efforts. For example, the segmentation job performer 232 may transmit the anatomical information or statistical information of the object obtained in the process of segmenting the image of the object from the medical image of the examinee, to the reference model generator 210. The reference model generator 210 may update the reference model by using the anatomical or statistical information received from the segmentation job performer 232.

Specifically, since the reference model is a standardized model of the object, a discrepancy may occur between a priori knowledge of an object obtainable from the reference model, e.g., anatomical information or statistical information of the object that has been considered from the beginning, and the actual, empirical anatomical information or the statistical information of the object of the examinee that is revealed when the medical image of the organ 40 is actually segmented. For example, if the object is a blood vessel distributed in a liver, a predetermined discrepancy may occur between a length or a radius of a blood vessel derived from the reference model and a length or a radius of the blood vessel that is actually distributed in the liver of the examinee. Therefore, the reference model generator 210 may update the reference model with reference to the image of the object segmented from the medical image of the examinee to generate the reference model on which a characteristic of the object of the examinee is reflected and better reflect real-world circumstances related to how objects are shaped.

Referring to FIGS. 2 and 6, if the determiner 240 determines that the first area in which the shape of the object is not estimated exists, the segmentation job performer 232 transmits information about the first area to the direction estimator 233. This information about the first area will subsequently allow the direction estimator 233 to deduce information about the first area in a way that segmentation can occur even when it is not immediately apparent what the shape of the first area is. Here, an example of an area in which a shape of an object is not estimated will be described later with reference to FIG. 7.

Figure 7:
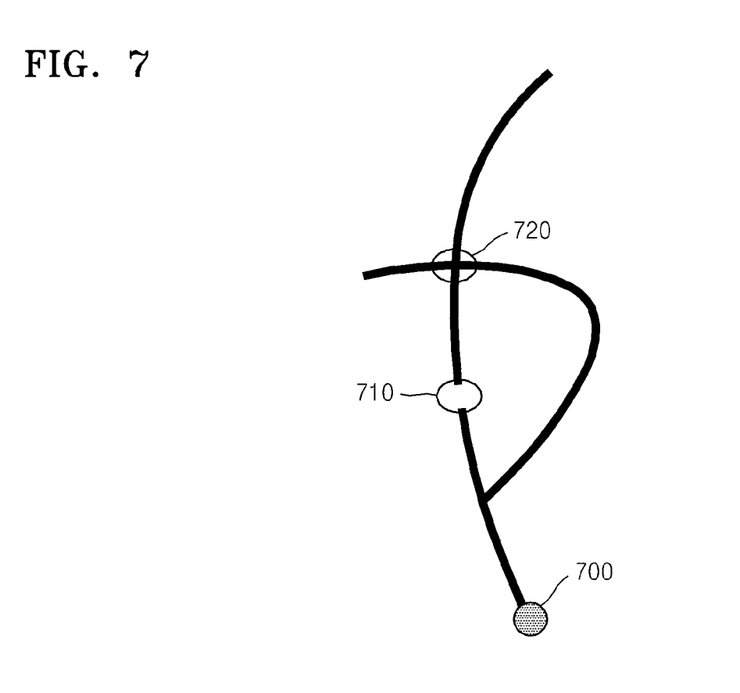
FIG. 7 is a diagram illustrating a first area in which a shape of an object is not estimated, according to an embodiment.

FIG. 7 is a diagram illustrating a first area in which a shape of an object is not estimated, according to an embodiment.

Referring to FIG. 7, the first area is an area 710 in which information about an object is lost or an area 720 in which two or more ones of branches forming the object overlap with each other. A circular point 700 of FIG. 7 refers to a start point corresponding to the object.

Referring to FIG. 6 again, the direction estimator 233 analyzes a characteristic of the first area by using information about the area in which the shape of the object is not estimated and the reference model received from the reference model generator 210. Here, the information about the area is received from the determiner 240. The direction estimator 233 also estimates a progression direction of the first area by using the analyzed characteristic. Here the progression direction of the first area may refer to a direction in which the segmentation job performer 232 segments an image of the first area from the medical image of the examinee.

More specifically, the direction estimator 233 defines an area of the medical image of the examinee corresponding to the first area in the reference model. The direction estimator 233 calculates a curvature or torsion degree of the area defined in the reference model. Here, the curvature or torsion degree is calculated based on the shape of the object as it appears in the reference model. The curvature refers to the rate of change of the curve's unit tangent vector, and the torsion refers to the rate of change of the curve's osculating plane. By making these calculations, the direction estimator 233 is able to infer how to segment the object, even if the object is not entirely visible.

For example, if the object is the blood vessels distributed in the liver, the direction estimator 233 may define the area corresponding to the first area in the reference model and calculate a curvature or torsion degree in a centerline of the blood vessels constituting the defined area of the reference model. Here, a detailed algorithm to calculate the curvature or torsion degree may be used.

Figure 8:
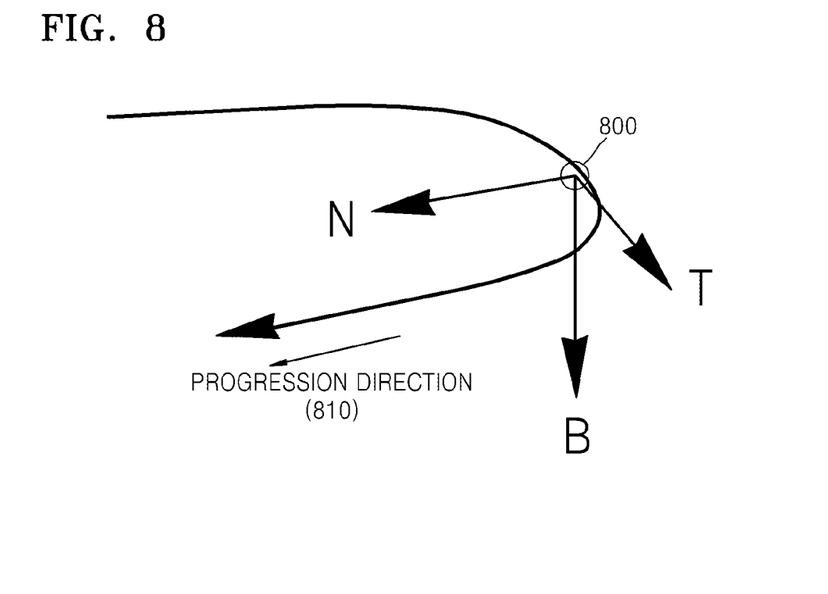
FIGS. 8 and 9 are diagrams illustrating a method of estimating a progression direction of an area in which a shape of an object is not estimated, according to an embodiment.
Figure 9:
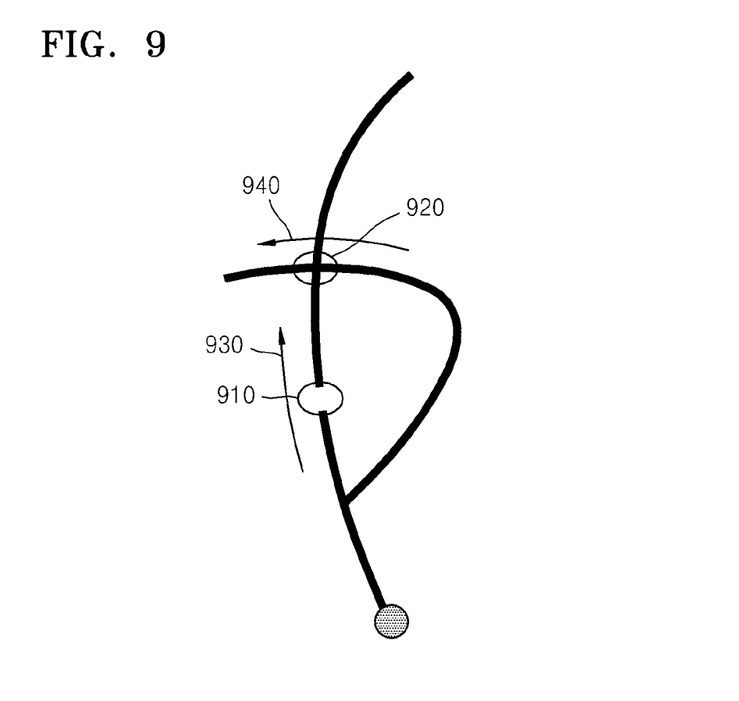

FIGS. 8 and 9 are views illustrating a method of estimating a progression direction of an area in which a shape of an object is not estimated, according to an embodiment.

The direction estimator 233 estimates the progression direction of the first area according to Equation 1 below by using the calculated curvature and/or torsion degree.

$$\begin{bmatrix} T' \\ N' \\ B' \end{bmatrix} = \begin{bmatrix} O & K & O \\ -K & O & \tau \\ O & -\tau & O \end{bmatrix} \begin{bmatrix} T \\ N \\ B \end{bmatrix} \quad \text{Equation 1}$$

Referring to FIG. 8, in Equation 1 above, K denotes a curvature at a point 800 of the first area, and τ denotes a torsion degree at the point 800. Also, T denotes a unit tangent vector at the point 800, N denotes a unit normal vector at the point, and B denotes a unit double normal vector. If T', N', and B' deduced from the calculation result of Equation 1 above are combined, a progression direction 810 of the point 800 is obtained.

A formula relating the unit tangent vector, the unit normal vector, and the unit double normal vector is presented in Equation 2. Also, the unit tangent vector, the unit normal vector, and the unit double normal vector are perpendicular to one another as shown in FIG. 8.

$$B = T \times N \quad \text{Equation 2}$$

Referring to FIG. 6 again, the direction estimator 233 transmits information about the estimated progression direction to the segmentation job performer 232. The segmentation job performer 232 segments the image of the first area by using the received information.

For example, referring to FIG. 9, if a medical image of an examinee includes an area 910 in which information about an object is lost, the segmentation job performer 232 receives information about an estimated progression direction 930 from the direction estimator 233 and segments an image in response to the progression direction 930.

Although the medical image of the examinee includes an area in which the information about the object is lost, the segmentation job performer 232 may segment a completed image of the object from the medical image of the examinee through this process, by using the determined progression direction 930 to provide missing information that allows completed segmentation.

Referring to FIG. 9, if the medical image of the examinee includes an area 920 in which at least two or more ones of branches forming the object overlap with each other, the segmentation job performer 232 receives information about a progression direction 940 from the direction estimator 233 and segments an image in response to the progression direction 940.

The segmentation job performer 232 may segment an image of an area in which pieces of information overlap with each other from the medical image of the examinee. Therefore, although the medical image of the examinee includes an area in which at least two or more single branches forming the object overlap with each other, the segmentation job performer 232 may segment a completed image of the object from the medical image of the examinee through this process.

Referring to FIG. 6 again, the segmentation job performer 232 may segment the image of the object from the medical image of the examinee according to the progression direction 930 or the progression 940 of FIG. 9 estimated by the direction estimator 233 with reference to information of the reference model. As discussed above, the progression direction 930 and the progression direction 940 provide information that allows the segmentation job performer 232 to do its job. The information of the reference model may include a length or a radius of the object in the reference model.

In some situations, if a discrepancy occurs in the progression direction 930 or the progression direction 940 estimated by the direction estimator 233, the image of the object segmented from the medical image of the examinee by the segmentation job performer 232 may be different from the real shape of the object. Nevertheless, the segmentation job performer 232 may segment the image of the object with reference to the information provided by the reference model.

More specifically, if information about the image of the object segmented in response to the progression direction 930 or the progression direction 940 of FIG. 9 estimated by the direction estimator 233 has a value greater than or equal to a predetermined error value with the information of the reference model, the segmentation job performer 232 stops segmenting the image of the object. Here, the predetermined error value may be directly input by a user through the interface 220 with reference to the information of the reference model or may be automatically determined by the segmentation job performer 232 without the need for an intervention of the user. This error value determination process, which occurs in some embodiments, is important because it helps to identify situations where the a priori knowledge used to assemble the reference model is sufficiently different from the empirical evidence that it may be worth reviewing whether using the reference model is helpful or not.

As described above, the segmentation job performer 232 may segment the image of the object based on the information of the reference model to prevent the image of the object from being segmented from the medical image of the examinee in another path. Assuming that the reference model does not exceed an error threshold, as was just discussed, using the reference model as part of the operation of segmentation job performer 232 will generally improve the final results of the segmentation.

Figure 10:
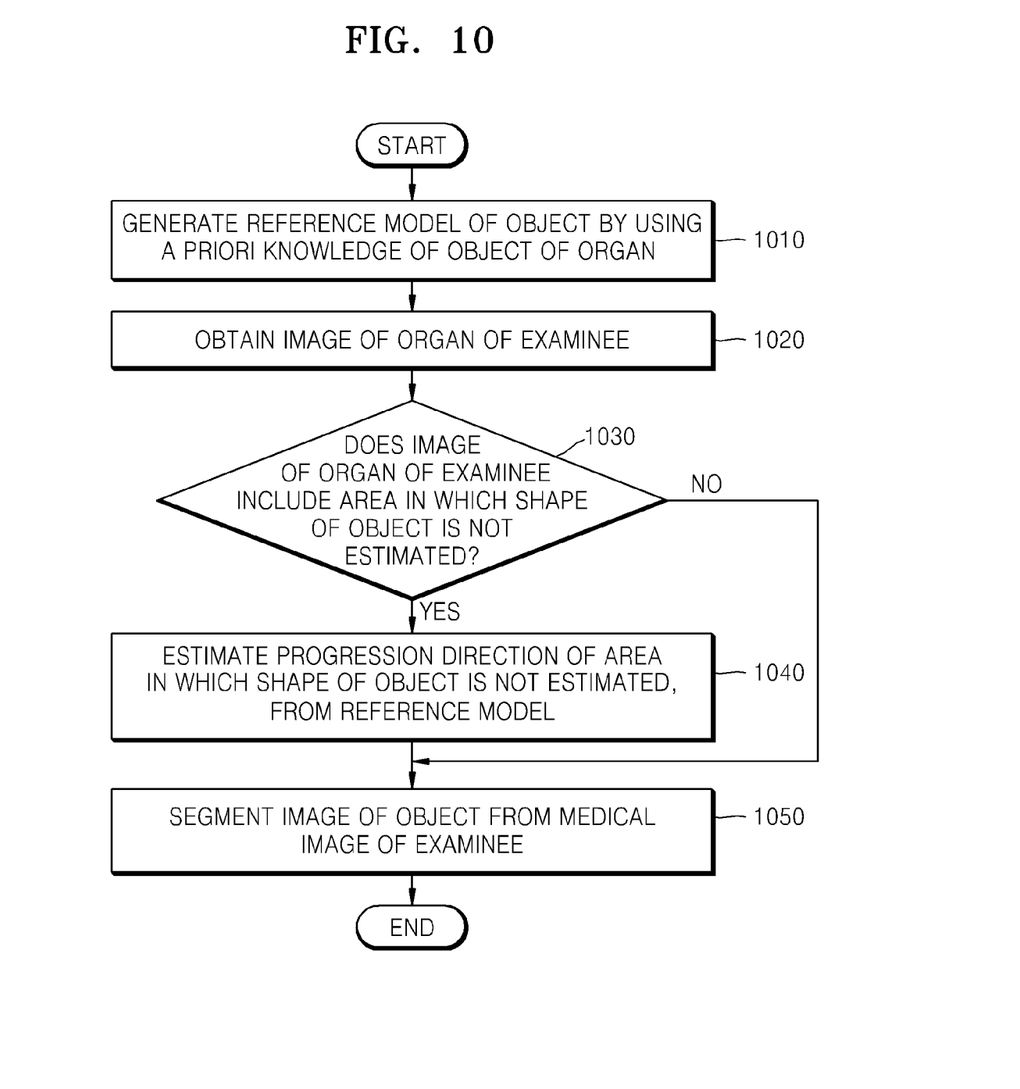
FIG. 10 is a flowchart illustrating a method of segmenting an image of an object from an image of an organ, according to an embodiment.

FIG. 10 is a flowchart illustrating a method of segmenting an image of an object from an image of an organ, according to an embodiment. Referring to FIG. 10, the method includes operations processed in time series in the image segmenting apparatus 20 of FIGS. 1 through 3 and 7 and the system 1 for segmenting the image of the object. Therefore, although not repeated hereinafter, the above descriptions related to the image segmenting apparatus 20 or the system 1 shown in FIGS. 1-3 and 7 are also applicable to the method of FIG. 10.

In operation 1010, the reference model generator 210 generates a reference model of the object by using a priori knowledge of the object included in the organ.

In operation 1020, the interface 220 obtains an image of the organ of an examinee.

In operation 1030, the determiner 240 determines whether the image of the organ of the examinee includes an area in which a shape of the object is not estimated. If it is determined in operation 1030 that the image of the organ of the examinee includes the area, the process goes to operation 1040. If it is determined in operation 1030 that the image of the organ of the examinee does not include the area, the process goes to operation 1050.

In operation 1040, the direction estimator 233 estimates a progression direction of the area from the reference model.

In operation 1050, the segmentation job performer 232 segments an image of the object from the image of the organ of the examinee.

As described above, according to the method of segmenting the image of the object from the image of the organ, the segmentation job of the image is automatically performed by the image segmenting apparatus 20 without an intervention of a user. Therefore, a segmentation speed of the image may be further increased than in a method of segmenting an image of an object from a medical image of an examinee by a user.

Also, the image segmenting apparatus 20 may segment the image of the organ from a medical image of the examinee by using anatomical information of the image of the organ to further precisely segment the image of the object.

In addition, the image segmenting apparatus 20 may segment the image of the object with reference to the reference model. Therefore, the image segmenting apparatus 20 may segment the image of the object from the medical image of the examinee regardless of which type of medical image is being used or whether the medical image includes an unclear part.

As described above, according to the one or more of the above embodiments of the present invention, even if information about an object is insufficient in an image of an organ, a lost part may be recovered by using information that characterizes a reference model of the object. Therefore, an image of the object may be precisely segmented from the image of the organ.

The units described herein may be implemented using hardware components. For example, hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The non-transitory computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. For example, RAM may include static RAM (SRAM) or dynamic RAM (DRAM). Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

The embodiments may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

It may be understood that the embodiments described therein may be considered in a descriptive sense only and not for purposes of limitation. Descriptions of features or aspects within each embodiment may be considered as available for other similar features or aspects in other embodiments.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of segmenting an image of an object from an image of an organ, comprising:
   generating a reference model of the object by using a priori knowledge related to the object of the organ, the a priori knowledge comprising medical images of the organ obtained from a plurality of persons;
   determining whether a first image of the organ comprises a first area in which a shape of the object is unidentified;
   in response to determining that the first image excludes the first area, segmenting a second image of the object from the first image; and
   in response to determining that the first image comprises the first area, estimating a progression direction of the first area from the reference model to segment a second image of the object from the first image.

2. The method of claim 1, further comprising:
   updating the reference model based on the second image.

3. The method of claim 1, wherein when the determining determines the first image to comprise the first area, the method further comprises:
   estimating the progression direction of the first area by analyzing a characteristic of an area corresponding to the first area of the reference model to segment the second image from the first image.

4. The method of claim 3, further comprising:
   calculating a curvature or torsion degree of the area corresponding to the first area of the reference model,
   wherein the progression direction of the first area is estimated by using the curvature or torsion degree to segment the second image from the first image.

5. The method of claim 1, further comprising:
   configuring the first area to comprise an area in which information about the object is lost.

6. The method of claim 1, further comprising:
   configuring the first area to comprise an area in which two or more individual branches forming the object overlap with each other.

7. The method of claim 1, wherein the generating of the reference model of the object comprises:
   obtaining an image indicating a shape of the organ;
   obtaining the a priori knowledge of the object from statistical information of the obtained image of the organ; and
   generating the reference model of the object by using the a priori knowledge.

8. The method of claim 1, further comprising:
   configuring the a priori knowledge of the object to comprise anatomical information of the object, the statistical information, or a combination thereof.

9. The method of claim 7, further comprising:
   configuring the a priori knowledge of the object to comprise anatomical information of the object, the statistical information, or a combination thereof.

10. A computer program embodied on a non-transitory computer readable medium, the computer program configured to control a processor to perform the method of claim 1.

11. An apparatus to segment an image of an object from an image of an organ, comprising:
    a reference model generator configured to generate a reference model of the object by using a priori knowledge related to the object of the organ, the a priori knowledge comprising medical images of the organ obtained from a plurality of persons;
    a determiner configured to determine whether a first image of the organ comprises a first area in which a shape of the object is unidentified; and
    an image segmenting part configured to segment a second image of the object from the first image in response to determining that the first image excludes the first area and to estimate a progression direction of the first area from the reference model to segment the second image from the first image in response to determining that the first image comprises the first area.

12. The apparatus of claim 11, wherein the reference model generator updates the reference model with reference to the second image.

13. The apparatus of claim 11, wherein in response to determining that the first image comprises the first area, the image segmenting part estimates the progression direction of the first area by analyzing a characteristic of an area corresponding to the first area of the reference model to segment the second image from the first image.

14. The apparatus of claim 13, wherein the image segmenting part calculates a curvature or torsion degree of the area corresponding to the first area of the reference model and estimates the progression direction of the first area by using the curvature or torsion degree to segment the second image from the first image.

15. The apparatus of claim 11, wherein the first area comprises an area in which information about the object is lost.

16. The apparatus of claim 11, wherein the first area comprises an area in which t two or more individual branches forming the object overlap with each other.

17. The apparatus of claim 11, wherein the reference model generator obtains an image indicating a shape of the organ, obtains the a priori knowledge of the object from statistical information of the obtained images or the organ, and generates the reference model of the object by using the a priori knowledge.

18. The apparatus of claim 11, wherein the a priori knowledge of the object comprises anatomical information of the object, the statistical information, or a combination thereof.

19. The apparatus of claim 17, wherein the a priori knowledge of the object comprises anatomical information of the object, the statistical information, or a combination thereof.

* * * * *